( 12 ) United States Patent
Takada et al.

(10) Patent No.: US 9,238,985 B2
(45) Date of Patent: Jan. 19, 2016

(54) EXHAUST GAS PURIFICATION APPARATUS FOR INTERNAL COMBUSTION ENGINE

(75) Inventors: Keishi Takada, Hadano (JP); Shunsuke Toshioka, Susono (JP); Shigeki Nakayama, Gotenba (JP); Ichiro Yamamoto, Kariya (JP); Junya Nakajima, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/409,652

(22) PCT Filed: Jun. 20, 2012

(86) PCT No.: PCT/JP2012/065742
§ 371 (c)(1),
(2), (4) Date: Jan. 13, 2015

(87) PCT Pub. No.: WO2013/190659
PCT Pub. Date: Dec. 27, 2013

(65) Prior Publication Data
US 2015/0184569 A1 Jul. 2, 2015

(51) Int. Cl.
*G01N 21/00* (2006.01)
*F01N 3/20* (2006.01)
*B01D 53/94* (2006.01)

(52) U.S. Cl.
CPC ............ *F01N 3/208* (2013.01); *B01D 53/9431* (2013.01); *F01N 2560/026* (2013.01); *F01N 2560/06* (2013.01); *F01N 2560/14* (2013.01); *F01N 2610/02* (2013.01); *F01N 2900/0416* (2013.01); *F01N 2900/0601* (2013.01);*F01N2900/1616* (2013.01); *F01N 2900/1622* (2013.01); *Y02T 10/24* (2013.01); *Y02T 10/47* (2013.01)

(58) Field of Classification Search
CPC ................................ G01N 21/00; F01N 3/208
See application file for complete search history.

(56) References Cited

U.S. PATENT DOCUMENTS

| 7,858,060 | B2 | 12/2010 | Gady et al. |
| 2003/0182935 | A1 | 10/2003 | Kawai et al. |
| 2010/0024389 | A1 | 2/2010 | Gady et al. |
| 2010/0050614 | A1 | 3/2010 | Parmentier et al. |
| 2010/0122524 | A1 | 5/2010 | Solbrig |

FOREIGN PATENT DOCUMENTS

| EP | 2 025 388 | 2/2009 |
| EP | 2 375 022 | 10/2011 |
| JP | 2003-293737 | 10/2003 |

OTHER PUBLICATIONS

D. Seher et al., "Control Strategy for NOx—Emission Reduction with SCR," SAE Technical Paper Series 2003-01-3362 (Nov. 2003).

*Primary Examiner* — Jyoti Nagpaul
(74) *Attorney, Agent, or Firm* — Finnegan, Henderson, Farabow, Garrett & Dunner, LLP

(57) ABSTRACT

To estimate an amount of reducing agent adsorbed to a selective reduction type NOx catalyst with a higher degree of precision, an amount of variation over a predetermined time in a reducing agent amount adsorbed to a selective reduction type NOx catalyst is calculated from an upper limit value of a reducing agent amount that is adsorbed to the selective reduction type NOx catalyst when the reducing agent is supplied continuously by a supply unit, which is calculated on the basis of a temperature of the selective reduction type NOx catalyst, and the reducing agent amount adsorbed to the selective reduction type NOx catalyst, whereupon a reducing agent amount adsorbed to the selective reduction type NOx catalyst following the elapse of the predetermined time is estimated by adding the variation amount to the reducing agent amount adsorbed to the selective reduction type NOx catalyst.

4 Claims, 5 Drawing Sheets

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2012/065742, filed Jun. 20, 2014, the content of which is incorporated herein by reference.

TECHNICAL FIELD

The present invention relates to an exhaust gas purification apparatus for an internal combustion engine.

BACKGROUND ART

Patent Document 1 describes providing a selective reduction type NOx catalyst (also referred to hereafter as an SCR catalyst) that selectively reduces NOx contained in exhaust gas by adsorbing ammonia ($NH_3$) in an exhaust passage of an internal combustion engine, and calculating an amount of ammonia consumed by the SCR catalyst on the basis of an amount of NOx discharged from the internal combustion engine and a NOx purification ratio of the SCR catalyst. Further, Patent Document 1 describes calculating an amount of ammonia adsorbed to the SCR catalyst in accordance with the amount of consumed ammonia and an amount of added reducing agent, and adjusting the amount of added reducing agent in accordance with the adsorption amount.

Incidentally, the ammonia adsorbed to the SCR catalyst may decrease even when NOx is not purified thereby. For example, when a temperature of the SCR catalyst increases, ammonia is desorbed from the SCR catalyst, and therefore the amount of ammonia adsorbed to the SCR catalyst decreases. Hence, an estimated value of the amount of ammonia adsorbed to the SCR catalyst may be larger than an actual value. When the amount of added reducing agent is adjusted in accordance with the estimated value, therefore, the amount of added reducing agent may be inappropriate.

PRIOR ART REFERENCES

Patent Document

Patent Document 1: Japanese Patent Application Publication No. 2003-293737

SUMMARY OF THE INVENTION

Problems to be Solved by the Invention

The present invention has been designed in consideration of the problem described above, and an object thereof is to estimate an amount of reducing agent adsorbed to a selective reduction type NOx catalyst with a higher degree of precision.

Means for Solving the Problems

To achieve the object described above, an exhaust gas purification apparatus for an internal combustion engine according to the present invention includes: a selective reduction type NOx catalyst that is provided in an exhaust passage of the internal combustion engine, and selectively reduces NOx when a reducing agent is supplied thereto; a supply unit that supplies the reducing agent to the selective reduction type NOx catalyst from an upstream side of the selective reduction type NOx catalyst; and a temperature acquisition unit that obtains a temperature of the selective reduction type NOx catalyst. Further, the exhaust gas purification apparatus includes: an upper limit value calculation unit that calculates, on the basis of the temperature of the selective reduction type NOx catalyst obtained by the temperature acquisition unit, an upper limit value of a reducing agent amount that is adsorbed to the selective reduction type NOx catalyst when the reducing agent is supplied continuously by the supply unit; a variation amount calculation unit that calculates a variation amount over a predetermined time in the reducing agent amount adsorbed to the selective reduction type NOx catalyst from the upper limit value calculated by the upper limit value calculation unit and the reducing agent amount adsorbed to the selective reduction type NOx catalyst; and an estimation unit that estimates a reducing agent amount adsorbed to the selective reduction type NOx catalyst following the elapse of the predetermined time by adding the variation amount calculated by the variation amount calculation unit to the reducing agent amount adsorbed to the selective reduction type NOx catalyst.

Here, when the reducing agent is supplied in a larger amount than an amount of reducing agent required to reduce NOx flowing into the selective reduction type NOx catalyst (SCR catalyst), surplus reducing agent is adsorbed to the SCR catalyst. When the reducing agent continues to be supplied to the SCR catalyst, a reducing agent amount adsorbed to the SCR catalyst per unit time becomes equal to a reducing agent amount desorbed from the SCR catalyst per unit time. At this time, the amount of reducing agent adsorbed to the SCR catalyst and the amount of reducing agent desorbed from the SCR catalyst are balanced. When identical operating conditions and an identical reducing agent supply amount are maintained, the reducing agent amount adsorbed to the SCR catalyst at this time serves as the upper limit value of the reducing agent amount adsorbed to the SCR catalyst.

Hence, the reducing agent amount adsorbed to the SCR catalyst has an upper limit, and once the reducing agent amount adsorbed to the SCR catalyst has reached the upper limit value, the reducing agent amount adsorbed to the SCR catalyst does not increase even when the reducing agent continues to be supplied. Instead, the reducing agent is desorbed from the SCR catalyst. The reducing agent is desorbed from the SCR catalyst likewise when the temperature of the SCR catalyst increases. The reducing agent desorbed from the SCR catalyst flows out of the SCR catalyst after being oxidized, or flows out of the SCR catalyst as is.

Note that the reducing agent amount adsorbed to the SCR catalyst per unit time (also referred to as a reducing agent adsorption speed hereafter) may also be determined on the basis of a reducing agent amount flowing into the SCR catalyst per unit time (also referred to hereafter as a reducing agent inflow speed) and a reducing agent amount consumed by the SCR catalyst per unit time (also referred to hereafter as a reducing agent consumption speed). Further, the reducing agent consumption speed has a correlative relationship with an amount of NOx reduced by the SCR catalyst per unit time. Hence, when the reducing agent amount adsorbed to the SCR catalyst has not yet reached the upper limit value, the reducing agent amount adsorbed to the SCR catalyst per unit time is equal to a reducing agent surplus generated in the SCR catalyst per unit time. It is assumed that the entire reducing agent surplus generated in the SCR catalyst is adsorbed to the SCR catalyst.

Hereafter, a reducing agent amount desorbed from the SCR catalyst per unit time will be referred to as a "reducing agent desorption speed". The reducing agent amount desorbed from the SCR catalyst is the amount of reducing agent that is desorbed from the SCR catalyst without reducing NOx.

Further, an overall reducing agent amount adsorbed to the SCR catalyst will be referred to as a reducing agent adsorption amount, and the overall reducing agent amount adsorbed to the SCR catalyst when the reducing agent adsorption speed and the reducing agent desorption speed are balanced will be referred to as a balanced adsorption amount. The balanced adsorption amount serves as the upper limit value of the reducing agent amount adsorbed to the SCR catalyst.

In the SCR catalyst, the reducing agent adsorption speed decreases and the reducing agent desorption speed increases as the reducing agent adsorption amount increases. Conversely, in the SCR catalyst, the reducing agent adsorption speed increases and the reducing agent desorption speed decreases as the reducing agent adsorption amount decreases. Hence, when the reducing agent is supplied continuously in a constant reducing agent supply amount, the reducing agent adsorption speed and the reducing agent desorption speed gradually approach a balanced condition.

As long as conditions such as the temperature of the SCR catalyst remain constant, the ease with which the reducing agent is adsorbed to the SCR catalyst and the ease with which the reducing agent is desorbed from the SCR catalyst never vary. Hence, by determining in advance a transition of the reducing agent adsorption amount up to the balanced adsorption amount when the reducing agent is supplied, the transition of the reducing agent adsorption amount when the reducing agent is supplied under identical conditions can be estimated. Accordingly, a subsequent transition of the reducing agent adsorption amount can be estimated from the upper limit value calculated by the upper limit value calculation unit and the reducing agent amount adsorbed to the SCR catalyst. As a result, the variation amount calculation unit can calculate the variation amount over the predetermined time in the reducing agent amount adsorbed to the SCR catalyst from the upper limit value calculated by the upper limit value calculation unit and the reducing agent amount adsorbed to the SCR catalyst. At this time, the variation amount calculation unit may calculate the variation amount in the reducing agent on the basis of predetermined information. Further, the amount of variation in the reducing agent adsorption amount may be calculated on the basis of the predetermined transition of the reducing agent adsorption amount. Furthermore, the predetermined time can be set as desired and used as a unit time or a short time, for example.

By determining the reducing agent adsorption amount successively in this manner, a current reducing agent adsorption amount and a reducing agent adsorption amount at a specific point in the future can be estimated. However, when the operating conditions of the internal combustion engine and so on vary, the balanced adsorption amount may also vary, and as a result, variation may occur in the transition of the reducing agent adsorption amount. At this time, a new balanced adsorption amount may be determined at the point where the new conditions are established. The transition of the reducing agent adsorption amount under the new conditions can then be determined on the basis of the newly determined balanced adsorption amount and the reducing agent adsorption amount prior to the variation in the conditions.

Thus, the amount of variation in the reducing agent adsorption amount over the predetermined time can be estimated. By integrating the amount of variation in the reducing agent adsorption amount, the reducing agent adsorption amount can be estimated.

Furthermore, according to the present invention, the variation amount calculation unit may calculate the variation amount from a difference between the upper limit value calculated by the upper limit value calculation unit and the reducing agent amount adsorbed to the selective reduction type NOx catalyst, and a predetermined transition of the reducing agent amount that is adsorbed to the selective reduction type NOx catalyst when the reducing agent is supplied continuously from the supply unit.

In other words, by determining in advance the transition of the reducing agent adsorption amount when the reducing agent is supplied continuously from the supply unit, the amount of variation in the reducing agent adsorption amount following the elapse of the predetermined time from an arbitrary point can be determined. When the difference between the balanced adsorption amount and the reducing agent adsorption amount is known, a point in the predetermined transition of the reducing agent adsorption amount can be specified, and therefore the amount of variation in the reducing agent adsorption amount can be calculated from the difference between the balanced adsorption amount and the reducing agent adsorption amount and the predetermined transition of the reducing agent adsorption amount. Note that the difference between the balanced adsorption amount and the reducing agent adsorption amount may be replaced by a ratio between the balanced adsorption amount and the reducing agent adsorption amount, and the amount of variation in the reducing agent adsorption amount may be calculated from the ratio. Further, the difference between the balanced adsorption amount and the reducing agent adsorption amount has a correlative relationship with the amount of variation in the reducing agent adsorption amount such that the variation amount decreases as the difference between the balanced adsorption amount and the reducing agent adsorption amount decreases. Therefore, the variation amount may be calculated by multiplying the difference between the balanced adsorption amount and the reducing agent adsorption amount by a predetermined value.

Furthermore, according to the present invention, the upper limit value calculation unit may calculate a reducing agent surplus generated in the selective reduction type NOx catalyst by subtracting a reducing agent amount consumed by the selective reduction type NOx catalyst while reducing the NOx from a reducing agent amount supplied by the supply unit, and the upper limit value calculation unit may calculate the upper limit value of the reducing agent amount that is adsorbed to the selective reduction type NOx catalyst when the reducing agent is supplied continuously by the supply unit, on the basis of the reducing agent surplus generated in the selective reduction type NOx catalyst and the temperature obtained by the temperature acquisition unit.

In other words, the reducing agent adsorption speed can be calculated by subtracting the reducing agent consumption speed from a reducing agent supply speed. Here, the balanced adsorption amount increases as the reducing agent adsorption speed increases. In other words, the balanced adsorption amount increases as the reducing agent surplus generated per unit time increases. The balanced adsorption amount also increases as the temperature of the SCR catalyst decreases. Hence, the reducing agent adsorption speed or the temperature of the SCR catalyst has a correlative relationship with the balanced adsorption amount. By determining relationships between these elements in advance, the balanced adsorption amount can be determined from the reducing agent adsorption speed and the temperature of the SCR catalyst.

The present invention may further include a determination unit that determines that the reducing agent is about to flow out of the selective reduction type NOx catalyst when a difference between the upper limit value calculated by the upper limit value calculation unit and the reducing agent amount adsorbed to the selective reduction type NOx catalyst, estimated by the estimation unit, is smaller than a threshold.

When the temperature of the SCR catalyst increases, the balanced adsorption amount decreases. The reducing agent adsorption amount does not increase beyond the balanced adsorption amount, and therefore, when the temperature of the SCR catalyst increases beyond a point at which the reducing agent adsorption amount and the balanced adsorption amount become equal, the reducing agent is desorbed from the SCR catalyst. In a situation where this condition may arise, the determination unit determines that the reducing agent is about to flow out of the SCR catalyst. In other words, it is determined that the reducing agent is about to flow out of the SCR catalyst before the reducing agent actually flows out of the SCR catalyst. Here, a time delay occurs between variation in the temperature of the SCR catalyst and desorption of the reducing agent from the SCR catalyst. Therefore, by calculating the balanced adsorption amount and the reducing agent adsorption amount immediately after the temperature of the SCR catalyst varies, it is possible to determine that the reducing agent is about to flow out of the SCR catalyst before the reducing agent actually flows out of the SCR catalyst.

To perform this determination, a threshold is provided in relation to the difference between the upper limit value calculated by the upper limit value calculation unit and the reducing agent adsorption amount estimated by the estimation unit. The threshold may be a difference between the reducing agent adsorption amount and a balanced adsorption amount serving as a boundary between whether or not the reducing agent will flow out of the SCR catalyst. Alternatively, the threshold may be set as a lower limit value of a difference between the balanced adsorption amount and the reducing agent adsorption amount at which the reducing agent does not flow out of the SCR catalyst.

Effect of the Invention

According to the present invention, the amount of reducing agent adsorbed to the selective reduction type NOx catalyst can be estimated with a higher degree of precision.

MODES FOR CARRYING OUT THE INVENTION

Specific embodiments of an exhaust gas purification apparatus for an internal combustion engine according to the present invention will be described below on the basis of the drawings.

First Embodiment

Figure 1:
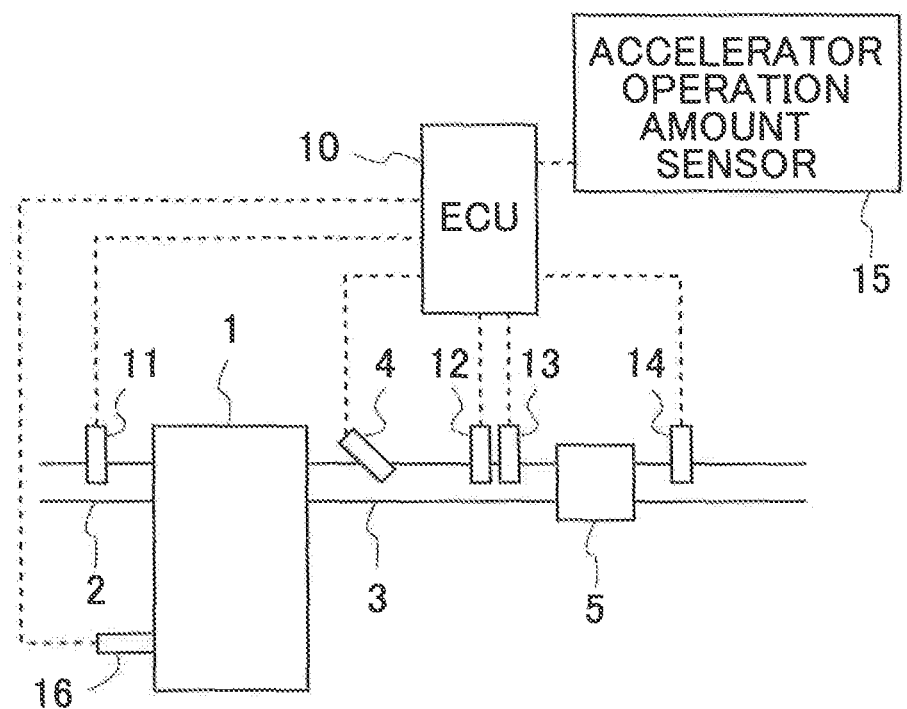
FIG. 1 is a schematic view showing a configuration of an exhaust gas purification apparatus for an internal combustion engine according to an embodiment.

FIG. 1 is a schematic view showing a configuration of an exhaust gas purification apparatus for an internal combustion engine according to an embodiment. An internal combustion engine 1 shown in FIG. 1 is a diesel engine, but may be a gasoline engine. The internal combustion engine 1 is installed in a vehicle, for example.

An intake passage 2 and an exhaust passage 3 are connected to the internal combustion engine 1. An air flow meter 11 that detects an amount of intake air flowing through the intake passage 2 is provided in the intake passage 2. Meanwhile, an injection valve 4 and a selective reduction type NOx catalyst 5 (referred to hereafter as an SCR catalyst 5) are provided in the exhaust passage 3 in order from an upstream side in an exhaust gas flow direction.

The injection valve 4 opens when a reducing agent is injected and closes when injection of the reducing agent is stopped. Ammonia ($NH_3$) is used as the reducing agent. Note that the injection valve 4 may inject urea water instead of ammonia. The urea water injected by the injection valve 4 is hydrolyzed into ammonia in the SCR catalyst 5, and then adsorbed to the SCR catalyst 5. In other words, either ammonia or a substance that ultimately changes into ammonia may be supplied from the injection valve 4. Further, the reducing agent may be supplied in the condition of a solid, a liquid, or a gas. In this embodiment, the injection valve 4 corresponds to a supply unit of the present invention.

Furthermore, the SCR catalyst 5 selectively reduces NOx using the adsorbed reducing agent. Therefore, by having the SCR catalyst 5 adsorb ammonia as the reducing agent in advance, the ammonia can be used to reduce NOx.

A temperature sensor 12 that detects an exhaust gas temperature is provided in the exhaust passage 3 on an upstream side of the SCR catalyst 5. The temperature sensor 12 detects the temperature of exhaust gas flowing into the SCR catalyst 5. A temperature of the SCR catalyst 5 can be estimated on the basis of the exhaust gas temperature. Note that a measurement value of the temperature sensor 12 may be set as the temperature of the SCR catalyst 5. Further, a temperature sensor may be attached on a downstream side of the SCR catalyst 5, and a measurement value of this temperature sensor may be set as the temperature of the SCR catalyst 5. Furthermore, the temperature of the SCR catalyst 5 may be measured by attaching a temperature sensor directly to the SCR catalyst 5. Moreover, the temperature of the SCR catalyst 5 may be estimated on the basis of operating conditions of the internal combustion engine 1. For example, an engine rotation speed, a fuel injection amount, an intake air amount, and the temperature of the SCR catalyst 5 have a correlative relationship, and therefore relationships between these elements may be determined in advance by experiments and the like, and plotted on a map. Note that in this embodiment, the temperature sensor 12 corresponds to a temperature acquisition unit of the present invention.

Further, a first NOx sensor 13 that detects a NOx concentration of the exhaust gas is provided in the exhaust passage 3 on the upstream side of the SCR catalyst 5. Furthermore, a second NOx sensor 14 that detects the NOx concentration of the exhaust gas is provided in the exhaust passage 3 on the downstream side of the SCR catalyst 5. With the first NOx sensor 13, the NOx concentration of the exhaust gas flowing into the SCR catalyst 5 can be measured. With the second NOx sensor 14, the NOx concentration of the exhaust gas flowing out of the SCR catalyst 5 can be measured. A NOx purification ratio of the SCR catalyst 5 can be calculated on the basis of measurement values of the first NOx sensor 13 and the second NOx sensor 14. The NOx purification ratio is a ratio between the amount of NOx flowing into the SCR catalyst 5 and the amount of NOx purified by the SCR catalyst 5. The NOx purification ratio can therefore be calculated by dividing a value obtained by subtracting the measurement value of the second NOx sensor 14 from the measurement value of the first NOx sensor 13 by the measurement value of the first NOx sensor 13.

Note that an oxidation catalyst and a particulate filter may be provided in the exhaust passage 3 on the upstream side of the injection valve 4.

An ECU 10 is installed side by side with the internal combustion engine 1, configured as described above, as an electronic control unit for controlling the internal combustion engine 1. The ECU 10 controls the internal combustion engine 1 in accordance with the operating conditions of the internal combustion engine 1 and requirements of a driver.

In addition to the sensors described above, an accelerator operation amount sensor 15 capable of detecting an engine load by outputting an electric signal corresponding to a depression amount of an accelerator pedal, and a crank position sensor 16 that detects the engine rotation speed are connected to the ECU 10 via electric wires such that output signals from the sensors are input into the ECU 10. Meanwhile, the injection valve 4 is connected to the ECU 10 via an electric wire such that the injection valve 4 is controlled by the ECU 10.

The ECU 10 estimates a reducing agent adsorption amount in the SCR catalyst 5 in a manner described below, and adjusts a reducing agent supply amount, for example, on the basis of the reducing agent adsorption amount. The ECU 10 adjusts the reducing agent supply amount so that a target NOx purification ratio is achieved and no reducing agent flows out of the SCR catalyst 5, for example.

Figure 2:
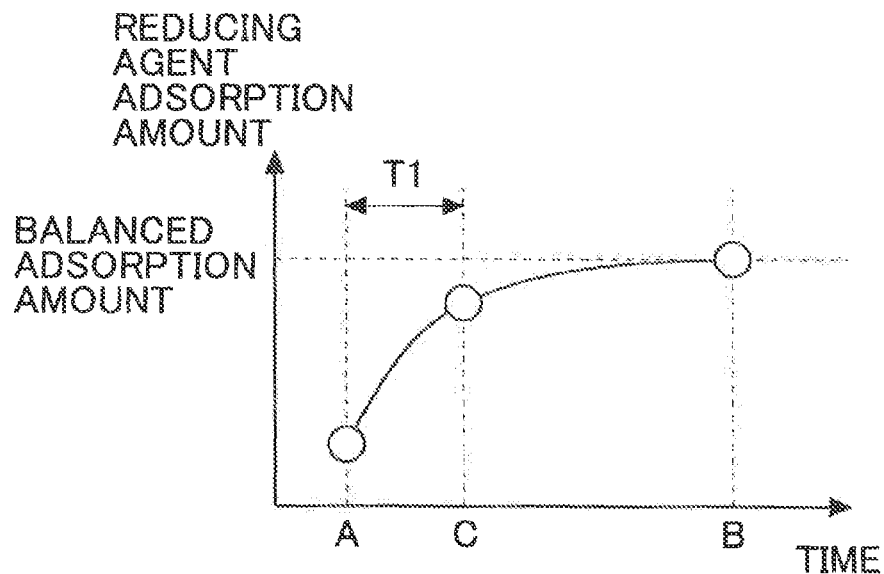
FIG. 2 is a time chart showing a transition of a reducing agent adsorption amount in an SCR catalyst.

FIG. 2 is a time chart showing a transition of the reducing agent adsorption amount in the SCR catalyst 5. FIG. 2 shows the transition of the reducing agent adsorption amount over a period extending from A to B, B being a point at which the reducing agent adsorption amount reaches a balanced adsorption amount. Note that the reducing agent adsorption amount is a total amount of reducing agent adsorbed to the SCR catalyst 5 at each point.

When the reducing agent is supplied continuously to the SCR catalyst 5 from the point indicated by A, the reducing agent adsorption amount converges on the balanced adsorption amount at the point indicated by B. When the reducing agent adsorption amount converges on the balanced adsorption amount, a reducing agent adsorption speed and a reducing agent desorption speed become equal. After the reducing agent adsorption amount has reached the balanced adsorption amount, therefore, as long as the reducing agent supply amount and operating conditions of the internal combustion engine 1 do not vary, the reducing agent adsorption amount does not increase even when the reducing agent continues to be supplied. When the reducing agent adsorption amount is equal to the balanced adsorption amount, the reducing agent adsorption amount reaches an upper limit value under the conditions established at that time.

Further, as long as the operating conditions of the internal combustion engine 1 do not vary, the transition of the reducing agent adsorption amount while the reducing agent is supplied is identical each time. For example, as long as the reducing agent adsorption speed and the temperature of the SCR catalyst 5 do not vary, the balanced adsorption amount is identical each time, and the transition of the reducing agent adsorption amount to the balanced adsorption amount is identical each time. Hence, by determining the transition of the reducing agent adsorption amount in advance in association with these conditions, a subsequent transition of the reducing agent adsorption amount can be estimated from the reducing agent adsorption amount and the conditions established at that time.

In FIG. 2, for example, as the reducing agent adsorption amount varies over the period extending from A to B, a reducing agent adsorption amount at a specific point indicated by C can be calculated on the basis of the reducing agent adsorption amount at the point indicated by A and a time T1 from A to C. The relationship shown in FIG. 2 may be determined in advance by experiments or the like. By storing the relationship in the ECU 10 in the form of a map, a model, or an equation, a reducing agent adsorption amount at a specific time before the balanced adsorption amount can be estimated from an initial value of the reducing agent adsorption amount and an elapsed time. Note that the transition of the reducing agent adsorption amount shown in FIG. 2, provided in the form of a map, a model, or an equation, will be referred to hereafter as "transition information". The transition information is used as information when calculating the reducing agent adsorption amount.

Further, an amount of variation in the reducing agent adsorption amount can be calculated on the basis of a difference between the balanced adsorption amount and the reducing agent adsorption amount, and the transition information. Note that the amount of variation in the reducing agent adsorption amount may be set as an amount of variation in the reducing agent adsorption amount per unit time. The amount of variation in the reducing agent adsorption amount per unit time takes the form of an inclination of a tangent of a curve indicating the transition of the reducing agent adsorption amount in FIG. 2. By integrating the amount of variation in the reducing agent adsorption amount from the point indicated by A, the reducing agent adsorption amount at a specific point can be estimated.

Here, when the reducing agent is supplied continuously, the difference between the balanced adsorption amount and the reducing agent adsorption amount decreases over time. As the reducing agent adsorption amount gradually approaches the balanced adsorption amount, an amount by which the reducing agent adsorption amount increases per unit time decreases. In other words, the reducing agent adsorption speed decreases and the reducing agent desorption speed increases as the reducing agent adsorption amount increases. Conversely, the reducing agent adsorption speed increases and the reducing agent desorption speed decreases as the reducing agent adsorption amount decreases. Hence, the difference between the balanced adsorption amount and the reducing agent adsorption amount has a correlative relationship with the amount of variation in the reducing agent adsorption amount. Accordingly, the amount of variation in the reducing agent adsorption amount can be determined from the difference between the balanced adsorption amount and the reducing agent adsorption amount, and the transition information. Similarly, a ratio between the balanced adsorption amount and the reducing agent adsorption amount has a correlative relationship with the amount of variation in the reducing agent adsorption amount. Accordingly, the amount of variation in the reducing agent adsorption amount can be determined from the ratio between the balanced adsorption amount and the reducing agent adsorption amount, and the transition information.

Note that the initial value of the reducing agent adsorption amount is set at zero. When the temperature of the SCR catalyst 5 increases, the reducing agent adsorbed to the SCR catalyst 5 is desorbed, leading to a reduction in the reducing agent adsorption amount. When a filter is provided in the exhaust passage 3, for example, filter regeneration is implemented by raising a temperature of the filter in order to remove particulate matter, and at this time, the temperature of the SCR catalyst 5 increases such that the reducing agent adsorption amount falls to zero. Further, when a storage reduction type NOx catalyst is provided in the exhaust passage 3, sulfur poisoning recovery processing is implemented on the storage reduction type NOx catalyst. When the sulfur poisoning recovery processing is implemented, the temperature of the SCR catalyst 5 increases such that the reducing agent adsorption amount falls to zero. The temperature of the SCR catalyst 5 likewise increases, causing the reducing agent adsorption amount to fall to zero, when the internal combustion engine 1 is operated at a high load for a long time. By integrating the amount of variation in the reducing agent adsorption amount after the reducing agent adsorption amount falls to zero in this manner, a current reducing agent adsorption amount can be estimated. A future reducing agent adsorption amount can also be estimated.

Figure 3:
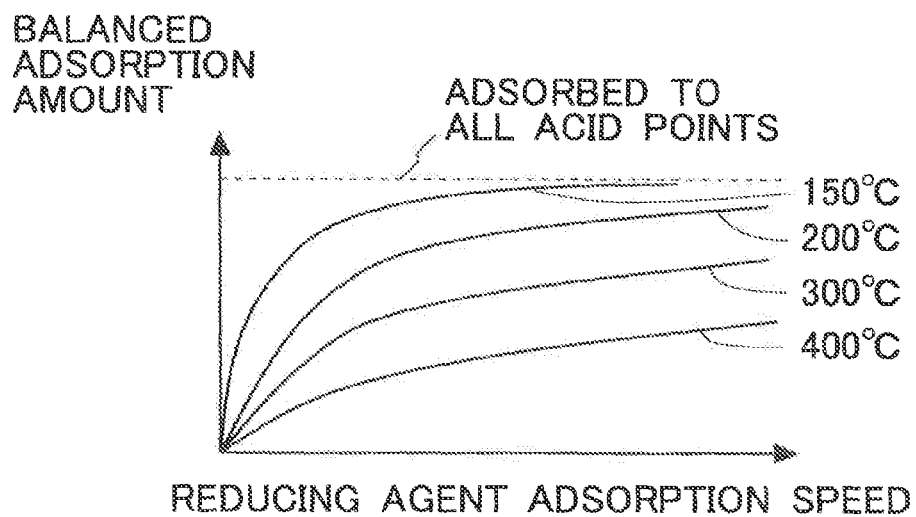
FIG. 3 is a view showing a relationship between a reducing agent adsorption speed and a balanced adsorption amount at respective temperatures of the SCR catalyst.

Incidentally, the operating conditions of the internal combustion engine 1 may vary during supply of the reducing agent. Here, FIG. 3 is a view showing a relationship between the reducing agent adsorption speed and the balanced adsorption amount at respective temperatures of the SCR catalyst 5. The reducing agent adsorption speed is a reducing agent surplus generated per unit time. In other words, the reducing agent adsorption speed takes a value obtained by subtracting an amount of reducing agent consumed by the SCR catalyst 5 per unit time (a reducing agent consumption speed) from an amount of reducing agent supplied from the injection valve 4 per unit time (a reducing agent inflow speed). It is assumed that the entire reducing agent surplus is adsorbed to the SCR catalyst 5. Further, in FIG. 3, "Adsorbed to all acid points" indicates a reducing agent adsorption amount generated when the reducing agent is adsorbed to all acid points serving as locations of the SCR catalyst 5 to which the reducing agent is adsorbed. This reducing agent adsorption amount is generated when a theoretical maximum amount of reducing agent is adsorbed to the SCR catalyst 5. Note that when an $HN_3$ concentration is set to be infinite, the reducing agent is adsorbed to all acid points at any theoretical temperature, and therefore the balanced adsorption amount is identical to the amount of reducing agent adsorbed to all acid points. Under normal operating conditions and a normal reducing agent concentration, however, the balanced adsorption amount is as shown in FIG. 3.

As shown in FIG. 3, when the temperature of the SCR catalyst 5 does not vary, the balanced adsorption amount increases as the reducing agent adsorption speed increases. Further, when the reducing agent adsorption speed does not vary, the balanced adsorption amount decreases as the temperature of the SCR catalyst 5 increases.

Hence, when conditions vary, variation may occur in the balanced adsorption amount. For example, when the operating conditions of the internal combustion engine 1 vary such that the temperature of the exhaust gas varies, the temperature of the SCR catalyst 5 varies, and as a result, variation may occur in the balanced adsorption amount. Further, when the operating conditions of the internal combustion engine 1 vary such that the NOx concentration of the exhaust gas varies, the reducing agent adsorption speed varies, and as a result, variation may occur in the balanced adsorption amount. When the balanced adsorption amount varies, the transition of the reducing agent adsorption amount also varies.

Figure 4:
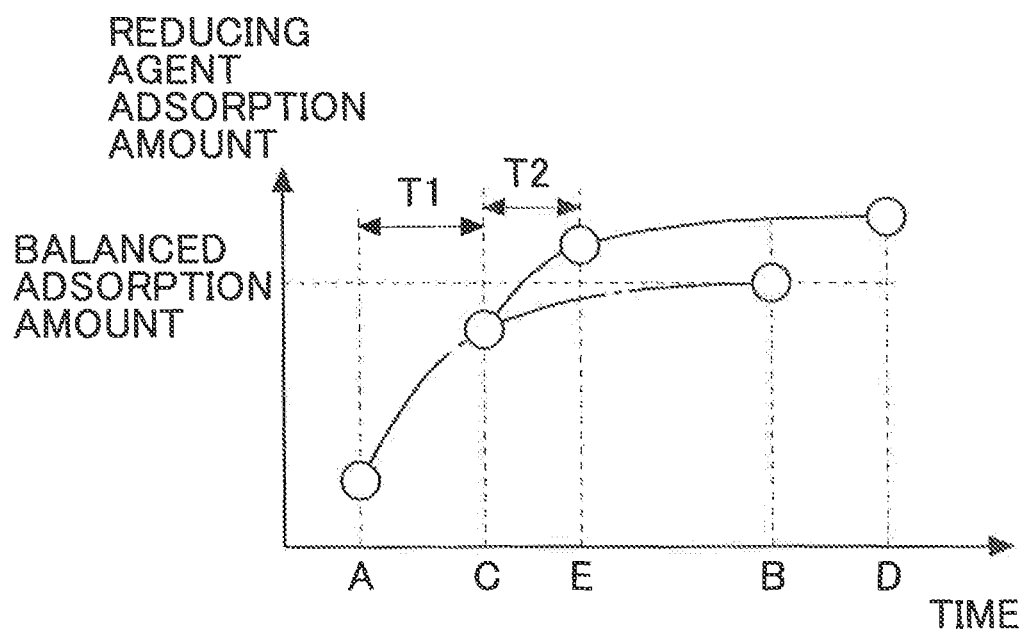
FIG. 4 is a time chart showing respective transitions of the reducing agent adsorption amount in the SCR catalyst when conditions vary and when conditions do not vary.

FIG. 4 is a time chart showing respective transitions of the reducing agent adsorption amount in the SCR catalyst 5 when conditions vary and when conditions do not vary. A solid line shows a case in which conditions vary, and a dot-dash line shows a case in which conditions do not vary. Further, points indicated by A, B, and C in FIG. 4 are identical to the points indicated by A, B, and C in FIG. 2. The solid line shows a case in which the conditions vary at the point C.

When the conditions vary, the reducing agent adsorption amount reaches the balanced adsorption amount at a point indicated by D. A predetermined time T2 from the point C at which the conditions vary elapses at a point indicated by E.

When the conditions vary before a time T1 elapses between A and C, the balanced adsorption amount can be determined from the relationship shown in FIG. 3 at the point indicated by C. In other words, the balanced adsorption amount under the new conditions can be calculated from the reducing agent adsorption speed and the temperature of the SCR catalyst 5 at the point indicated by C, and the relationship shown in FIG. 3. Note that the relationship shown in FIG. 3 is determined in advance by experiments and the like, and stored in the ECU 10.

When the conditions vary, the amount of variation in the reducing agent adsorption amount can be calculated at the point indicated by C in a similar manner to the amount of variation in the reducing agent adsorption amount calculated at the point indicated by A. By calculating the balanced adsorption amount and the reducing agent adsorption amount successively in this manner, the reducing agent adsorption amount can be determined continuously.

Note that as the difference between the balanced adsorption amount and the reducing agent adsorption amount decreases, the reducing agent adsorption amount becomes steadily less likely to increase, and as a result, the amount of variation in the reducing agent adsorption amount over a predetermined time decreases. Hence, amounts of variation in the reducing agent adsorption amount over the predetermined time corresponding to differences between the balanced adsorption amount and the reducing agent adsorption amount may be determined in advance. The amounts of variation thus determined may then be stored in the ECU 10 in the form of a map, a model, or an equation.

In FIG. 2 or FIG. 4, an estimation precision of the reducing agent adsorption amount can be improved by shortening the time T1 from A to C or the time T2 from C to E. This time may be set as a unit time or a short time, for example. Alternatively, the time may be set at one second, for example.

Note that the time required for the reducing agent adsorption amount to reach the balanced adsorption amount may vary in accordance with the temperature of the SCR catalyst 5 or a space velocity (SV) in the SCR catalyst 5. For example, the time required to reach the balanced adsorption amount shortens as the temperature of the SCR catalyst 5 increases. Further, for example, the time required to reach the balanced adsorption amount shortens as the SV in the SCR catalyst 5 increases. By taking these elements into consideration, the estimation precision of the reducing agent adsorption amount can be further improved. In other words, by storing a plurality of transition information in accordance with the temperature or the SV of the SCR catalyst 5, the estimation precision of the reducing agent adsorption amount can be improved.

Figure 5:
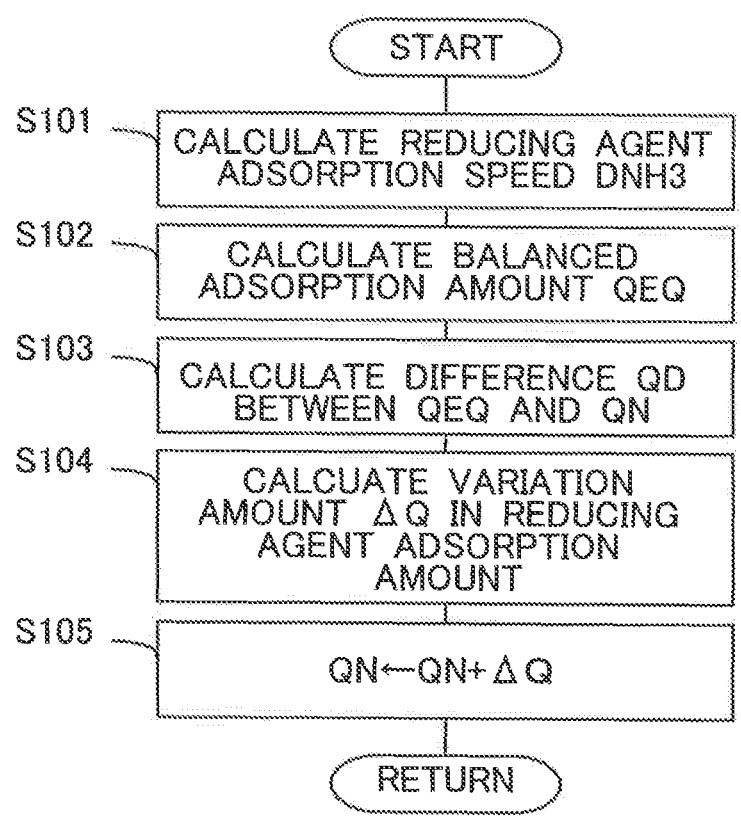
FIG. 5 is a flowchart showing a flow for estimating the reducing agent adsorption amount according to a first embodiment.

FIG. 5 is a flowchart showing a flow for estimating the reducing agent adsorption amount according to this embodiment. This routine is executed by the ECU 10 at predetermined time intervals.

In step S101, a reducing agent adsorption speed DNH3 is calculated from the reducing agent inflow speed and the reducing agent consumption speed. The reducing agent inflow speed is the amount of reducing agent flowing into the SCR catalyst 5 per unit time, and is equal to the amount of reducing agent supplied by the injection valve 4 per unit time. The amount of reducing agent supplied by the injection valve 4 per unit time has a correlative relationship with an opening time of the injection valve 4, and therefore this relationship is determined in advance by experiments and the like. The opening time of the injection valve 4 is determined by the ECU 10. Hence, the ECU 10 can calculate the amount of reducing agent supplied per unit time from the opening time of the injection valve 4.

Further, the reducing agent consumption speed is the amount of reducing agent consumed by the SCR catalyst 5 per unit time. The reducing agent consumption speed has a correlative relationship with an amount of NOx purified by the SCR catalyst 5 per unit time. The amount of NOx purified by the SCR catalyst 5 per unit time can be calculated on the basis of the NOx purification ratio and a flow rate of the exhaust gas. The NOx purification ratio can be calculated on the basis of the NOx concentration measured by the first NOx sensor 13 and the NOx concentration measured by the second NOx sensor 14. The flow rate of the exhaust gas has a correlative relationship with an intake air amount measured by the air flow meter 11, and can therefore be calculated on the basis of the intake air amount.

Hence, the reducing agent consumption speed is calculated on the basis of the NOx concentration measured by the first NOx sensor 13, the NOx concentration measured by the second NOx sensor 14, and the intake air amount measured by the air flow meter 11. Relationships between these elements may be stored in the ECU 10 in the form of a map or a model. Further, an equation for determining the reducing agent consumption speed may be stored in the ECU 10.

The reducing agent consumption speed may be determined on the basis of a map or a model of the NOx concentration measured by the first NOx sensor 13 and the NOx purification ratio under the conditions established at that time. In other words, the reducing agent consumption speed can be determined without providing the second NOx sensor 14. Furthermore, the amount of NOx discharged from the internal combustion engine 1 may be estimated on the basis of a map or a model, and the reducing agent consumption speed may be determined on the basis of a map or a model of the NOx discharge amount and the NOx purification ratio under the conditions established at that time. In this case, neither the first NOx sensor 13 nor the second NOx sensor 14 is required. When the processing of step S101 is complete, the routine advances to step S102.

In step S102, a balanced adsorption amount QEQ is calculated from the reducing agent adsorption speed DNH3 and the temperature of the SCR catalyst 5. The balanced adsorption amount QEQ may be determined on the basis of the relationship shown in FIG. 3. The relationship shown in FIG. 3 is determined in advance by experiments and the like, and stored in the ECU 10. When the processing of step S102 is complete, the routine advances to step S103. Note that in this embodiment, the ECU 10 that performs the processing of step S102 corresponds to an upper limit value calculation unit of the present invention.

In step S103, a difference QD between the balanced adsorption amount QEQ and a reducing agent adsorption amount QN is calculated. The initial value of the reducing agent adsorption amount QN is zero. The reducing agent adsorption amount QN is updated successively in step S105, to be described below. Note that the reducing agent adsorption amount QN calculated in this step may be the reducing agent adsorption amount at a predetermined point in time. When the processing of step S103 is complete, the routine advances to step S104.

In step S104, an amount of variation ΔQ in the reducing agent adsorption amount per unit time is calculated from the difference QD calculated in step S103 and the transition information stored in the ECU 10. In this step, the variation amount ΔQ is calculated using the time T1 shown in FIG. 2 or the time T2 shown in FIG. 4 as the unit time. Note that in this step, an amount of variation in the reducing agent adsorption amount between a previous routine and a current routine may be determined. The transition information is determined in advance by experiments and the like, and stored in the ECU 10.

Further, in step S104, the amount of variation ΔQ in the reducing agent adsorption amount per unit time may be calculated in consideration of the fact that the difference QD between the balanced adsorption amount QEQ and the reducing agent adsorption amount QN decreases by a predetermined proportion per unit time. This predetermined proportion is determined in advance by experiments and the like so that the transition of the calculated reducing agent adsorption amount resembles the transition of the reducing agent adsorption amount shown in FIG. 2 as closely as possible. When the processing of step S104 is complete, the routine advances to step S105. Note that in this embodiment, the ECU 10 that performs the processing of step S104 corresponds to a variation amount calculation unit of the present invention.

In step S105, the variation amount ΔQ calculated in step S104 is added to the reducing agent adsorption amount QN, and the result is set as a new reducing agent adsorption amount QN. In other words, the reducing agent adsorption amount QN is updated. When the processing of step S105 is complete, the routine is terminated. Note that in this embodiment, the ECU 10 that performs the processing of step S105 corresponds to an estimation unit of the present invention.

By updating the reducing agent adsorption amount successively in this manner, the reducing agent adsorption amount midway to the balanced adsorption amount can be estimated. Furthermore, in this embodiment, the reducing agent adsorption amount is estimated using the balanced adsorption amount, and therefore the amount of ammonia desorbed from the SCR catalyst 5 is taken into account. Hence, the estimation precision of the reducing agent adsorption amount is high, and as a result, the reducing agent supply amount can be set appropriately. In other words, a situation in which the reducing agent supply amount is excessive such that the reducing agent flows out of the SCR catalyst 5 can be prevented. Further, a situation in which a smaller amount of reducing agent than the amount required to purify the NOx is supplied from fear that the reducing agent may flow out of the SCR catalyst 5 can be prevented. As a result, a reduction in the NOx purification ratio can be suppressed.

Second Embodiment

In this embodiment, a determination is made as to whether or not the reducing agent is about to flow out of the SCR catalyst 5. Note that in this embodiment, a determination is made as to whether or not the reducing agent is about to flow out of the SCR catalyst 5 due to the reducing agent adsorption amount becoming equal to the balanced adsorption amount. All other apparatuses and so on are identical to the first embodiment, and therefore description thereof has been omitted.

Here, when the temperature of the SCR catalyst 5 increases, the reducing agent is desorbed more easily, leading to a reduction in the balanced adsorption amount. When the balanced adsorption amount decreases in this manner, the reducing agent adsorption amount and the balanced adsorption amount become equal even if the reducing agent adsorption amount increases, and as a result, the reducing agent may flow out of the SCR catalyst 5.

In this embodiment, therefore, it is determined that the reducing agent is about to flow out of the SCR catalyst 5 when a difference between the balanced adsorption amount and the reducing agent adsorption amount is smaller than a threshold. The threshold is a lower limit value of a value at which no reducing agent is desorbed from the SCR catalyst 5, or a lower limit value of a value at which there is no danger of reducing agent desorption. The threshold may also be set at a value having a certain degree of leeway for suppressing outflow of the reducing agent. Alternatively, the threshold may be set at zero, for example.

Here, when the temperature of the SCR catalyst 5 increases, the balanced adsorption amount decreases such that a large amount of time is required for the reducing agent to be desorbed from the SCR catalyst 5. Hence, the reducing agent is not desorbed from the SCR catalyst 5 as soon as the operating conditions of the internal combustion engine 1 vary. Therefore, by calculating the balanced adsorption amount as soon as the temperature of the SCR catalyst 5 varies, the determination as to whether or not the reducing agent is about to flow out of the SCR catalyst 5 can be made before the reducing agent actually flows out of the SCR catalyst 5. Here, the balanced adsorption amount can be calculated on the basis of the varied temperature of the SCR catalyst 5 and the relationship shown in FIG. 3. Furthermore, the transition of the reducing agent adsorption amount is determined as described in the first embodiment. The determination as to whether or not the reducing agent is about to flow out of the SCR catalyst 5 is then made by comparing the difference between the balanced adsorption amount and the reducing agent adsorption amount thus determined with a threshold. Note that when the balanced adsorption amount is smaller than the reducing agent adsorption amount, it may be determined that the reducing agent is about to flow out of the SCR catalyst 5. As a result, the reducing agent supply amount can be adjusted before the reducing agent flows out of the SCR catalyst 5.

Further, following variation in the operating conditions of the internal combustion engine 1, it takes time for the temperature of the SCR catalyst 5 to vary in actuality. Hence, the varied temperature of the SCR catalyst 5 may be estimated before the temperature of the SCR catalyst 5 actually varies, and the balanced adsorption amount may be calculated on the basis of the estimated temperature. For example, the operating conditions of the internal combustion engine 1 and the temperature of the SCR catalyst 5 have a correlative relationship, and therefore the temperature of the SCR catalyst 5 can be predicted on the basis of the operating conditions of the internal combustion engine 1. The balanced adsorption amount can then be calculated on the basis of the predicted temperature of the SCR catalyst 5 and the relationship shown in FIG. 3. The determination as to whether or not the reducing agent is about to flow out of the SCR catalyst 5 may then be made by comparing the difference between the balanced adsorption amount and the reducing agent adsorption amount thus determined with a threshold.

Figure 6:
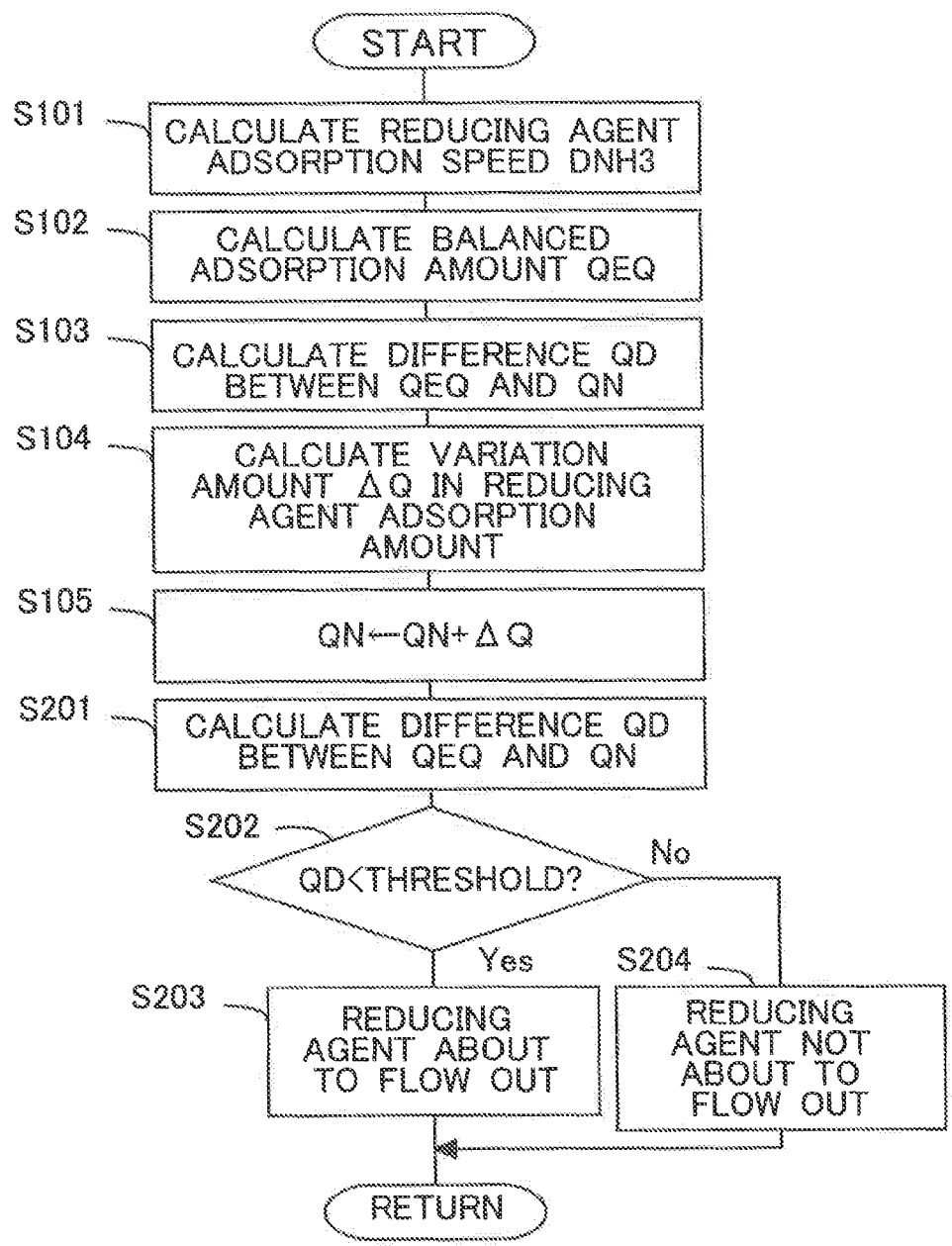
FIG. 6 is a flowchart showing a flow for determining whether or not a reducing agent is about to flow out of the SCR catalyst, according to a second embodiment.

FIG. 6 is a flowchart showing a flow for determining whether or not the reducing agent is about to flow out of the SCR catalyst 5, according to this embodiment. This routine is executed by the ECU 10 at predetermined time intervals. Note that steps in which identical processing to the flow shown in FIG. 5 is performed have been allocated identical step numbers, and description thereof has been omitted.

In this routine, when the processing of step S105 is complete, the routine advances to step S201. In step S201, the difference QD between the balanced adsorption amount QEQ and the reducing agent adsorption amount QN is calculated. The reducing agent adsorption amount QN takes the value calculated in step S105. The balanced adsorption amount QEQ takes the value determined in step S102, but when the conditions vary, the balanced adsorption amount QEQ is determined on the basis of the varied conditions. Note that when the temperature of the SCR catalyst 5 has not actually varied but variation in the temperature of the SCR catalyst 5 is predicted due to variation in the operating conditions of the internal combustion engine 1, the balanced adsorption amount may be calculated on the basis of the predicted varied temperature of the SCR catalyst 5. When the processing of step S201 is complete, the routine advances to step S202.

In step S202, a determination is made as to whether or not the difference QD calculated in step S201 is smaller than a threshold. In this step, a determination is made as to whether or not the reducing agent is about to flow out of the SCR catalyst 5. The threshold is a lower limit value of a value at which no reducing agent is desorbed from the SCR catalyst 5, or a lower limit value of a value at which there is no danger of reducing agent desorption. The threshold may also be set at zero.

Note that in step S202, the reducing agent adsorption amount QN following the elapse of a predetermined time from the present time may be predicted, and a determination may be made as to whether or not a difference between the balanced adsorption amount QEQ at this time and the predicted reducing agent adsorption amount QN is smaller than the threshold.

When the determination of step S202 is affirmative, the routine advances to step S203, where it is determined that the reducing agent is about to flow out of the SCR catalyst 5. When the determination of step S202 is negative, on the other hand, the routine advances to step S204, where it is determined that the reducing agent is not about to flow out of the SCR catalyst 5. Note that in this embodiment, the ECU 10 that performs the processing of steps S202, S203, and S204 corresponds to a determination unit of the present invention. By executing this routine repeatedly, the reducing agent adsorption amount QN is calculated repeatedly, and every time the reducing agent adsorption amount QN is calculated, a determination is made as to whether or not the difference between the balanced adsorption amount QEQ and the reducing agent adsorption amount QN is smaller than the threshold.

When the balanced adsorption amount and the reducing agent adsorption amount vary such that the difference between the balanced adsorption amount and the reducing agent adsorption amount equals or exceeds the threshold, it can be determined that the reducing agent is not about to flow out of the SCR catalyst 5. When, on the other hand, the balanced adsorption amount and the reducing agent adsorption amount vary such that the difference between the balanced adsorption amount and the reducing agent adsorption amount becomes smaller than the threshold, it can be determined that the reducing agent is about to flow out of the SCR catalyst 5.

According to this embodiment, as described above, the determination as to whether or not the reducing agent is about to flow out of the SCR catalyst 5 can be made before the reducing agent actually flows out of the SCR catalyst 5. As a result, the reducing agent supply amount can be adjusted to an appropriate value, for example, before the reducing agent flows out.

EXPLANATION OF REFERENCE NUMERALS AND CHARACTERS

1 internal combustion engine
2 intake passage
3 exhaust passage
4 injection valve
5 selective reduction type NOx catalyst (SCR catalyst)
10 ECU
11 air flow meter
12 temperature sensor
13 first NOx sensor
14 second NOx sensor
15 accelerator operation amount sensor
16 crank position sensor

The invention claimed is:

1. An exhaust gas purification apparatus for an internal combustion engine, including:
 a selective reduction type NOx catalyst that is provided in an exhaust passage of the internal combustion engine, and selectively reduces NOx when a reducing agent is supplied thereto;
 a supply unit that supplies the reducing agent to the selective reduction type NOx catalyst from an upstream side of the selective reduction type NOx catalyst; and
 a temperature acquisition unit that obtains a temperature of the selective reduction type NOx catalyst,
 the exhaust gas purification apparatus comprising:
 an upper limit value calculation unit that calculates, on the basis of the temperature of the selective reduction type NOx catalyst obtained by the temperature acquisition unit, an upper limit value of a reducing agent amount that is adsorbed to the selective reduction type NOx catalyst when the reducing agent is supplied continuously by the supply unit;
 a variation amount calculation unit that calculates a variation amount over a predetermined time in the reducing agent amount adsorbed to the selective reduction type NOx catalyst from the upper limit value calculated by the upper limit value calculation unit and the reducing agent amount adsorbed to the selective reduction type NOx catalyst; and
 an estimation unit that estimates a reducing agent amount adsorbed to the selective reduction type NOx catalyst following the elapse of the predetermined time by adding the variation amount calculated by the variation amount calculation unit to the reducing agent amount adsorbed to the selective reduction type NOx catalyst.

2. The exhaust gas purification apparatus for an internal combustion engine according to claim 1, wherein the variation amount calculation unit calculates the variation amount from a difference between the upper limit value calculated by the upper limit value calculation unit and the reducing agent amount adsorbed to the selective reduction type NOx catalyst, and a predetermined transition of the reducing agent amount that is adsorbed to the selective reduction type NOx catalyst when the reducing agent is supplied continuously from the supply unit.

3. The exhaust gas purification apparatus for an internal combustion engine according to claim 1, wherein the upper limit value calculation unit calculates a reducing agent surplus generated in the selective reduction type NOx catalyst by subtracting a reducing agent amount consumed by the selective reduction type NOx catalyst while reducing the NOx from a reducing agent amount supplied by the supply unit, and
 the upper limit value calculation unit calculates the upper limit value of the reducing agent amount that is adsorbed to the selective reduction type NOx catalyst when the reducing agent is supplied continuously by the supply unit, on the basis of the reducing agent surplus generated in the selective reduction type NOx catalyst and the temperature obtained by the temperature acquisition unit.

4. The exhaust gas purification apparatus for an internal combustion engine according to claim 1, further comprising a determination unit that determines that the reducing agent is about to flow out of the selective reduction type NOx catalyst when a difference between the upper limit value calculated by the upper limit value calculation unit and the reducing agent amount adsorbed to the selective reduction type NOx catalyst, estimated by the estimation unit, is smaller than a threshold.

* * * * *